(12) United States Patent
Gehring

(10) Patent No.: US 8,823,196 B1
(45) Date of Patent: Sep. 2, 2014

(54) APPARATUS OF WAVE GENERATORS AND A MOORING SYSTEM TO GENERATE ELECTRICITY

(71) Applicant: Donald H Gehring, Houston, TX (US)

(72) Inventor: Donald H Gehring, Houston, TX (US)

( * ) Notice: Subject to any disclaimer, the term of this patent is extended or adjusted under 35 U.S.C. 154(b) by 0 days.

(21) Appl. No.: 14/249,910

(22) Filed: Apr. 10, 2014

Related U.S. Application Data

(60) Provisional application No. 61/862,338, filed on Aug. 5, 2013.

(51) Int. Cl.
*H02P 9/04* (2006.01)
(52) U.S. Cl.
USPC ................................ 290/53; 290/42
(58) Field of Classification Search
USPC .......................... 290/42, 43, 53, 54
See application file for complete search history.

(56) References Cited

U.S. PATENT DOCUMENTS

| | | | | |
|---|---|---|---|---|
| 4,319,454 A | * | 3/1982 | Lucia ............................. | 60/506 |
| 4,516,033 A | * | 5/1985 | Olson ............................. | 290/54 |
| 4,718,231 A | * | 1/1988 | Vides ............................. | 60/398 |
| 4,742,241 A | * | 5/1988 | Melvin .......................... | 290/53 |
| 5,359,229 A | * | 10/1994 | Youngblood .................. | 290/53 |
| 5,808,368 A | * | 9/1998 | Brown ........................... | 290/53 |
| 6,365,984 B1 | * | 4/2002 | Shu ................................ | 290/53 |
| 6,695,536 B2 | * | 2/2004 | Sanchez Gomez ............ | 405/76 |
| 7,199,481 B2 | * | 4/2007 | Hirsch ........................... | 290/42 |
| 7,215,036 B1 | * | 5/2007 | Gehring ......................... | 290/54 |
| 7,319,278 B2 | * | 1/2008 | Gehring ......................... | 290/53 |
| 7,352,078 B2 | * | 4/2008 | Gehring ......................... | 290/54 |
| 7,474,013 B2 | * | 1/2009 | Greenspan et al. ........... | 290/53 |
| 7,557,456 B2 | * | 7/2009 | Kornbluh et al. .............. | 290/42 |
| 7,759,813 B2 | * | 7/2010 | Fujisato ......................... | 290/53 |
| 8,080,894 B2 | * | 12/2011 | Rourke .......................... | 290/53 |
| 8,421,259 B2 | * | 4/2013 | Ardoise et al. ................ | 290/53 |
| 8,536,724 B2 | * | 9/2013 | Dullaway ...................... | 290/53 |
| 8,763,389 B2 | * | 7/2014 | Stewart ......................... | 60/497 |

* cited by examiner

*Primary Examiner* — Nicholas Ponomarenko

(57) ABSTRACT

An apparatus of wave generators and a mooring system is used to generate electricity includes a floating hull and an anti-drift mooring system. The floating hull that functions as the floating member is tensionably coupled with a subsurface environment by the anti-drift mooring system, where the anti-drift mooring system can include different embodiments depending on the subsurface environment. Articulated pulley systems of the floating hull allow the anti-drift mooring system to efficiently maximize the power output of wave generator units of the floating hull as the articulated pulley systems and the wave generator units are positioned within the floating hull.

16 Claims, 23 Drawing Sheets

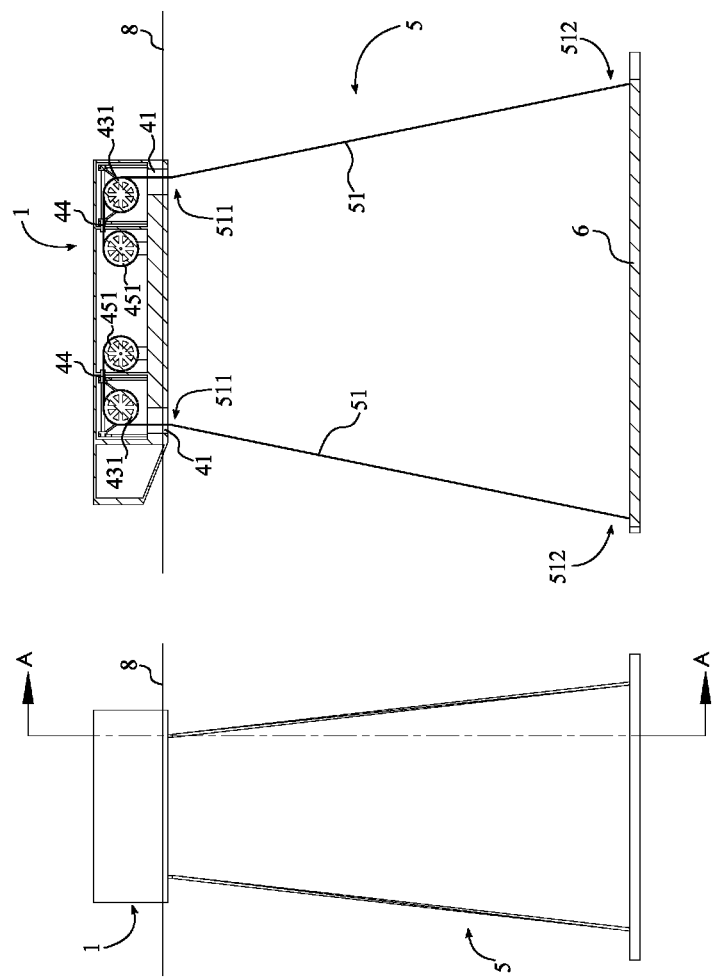

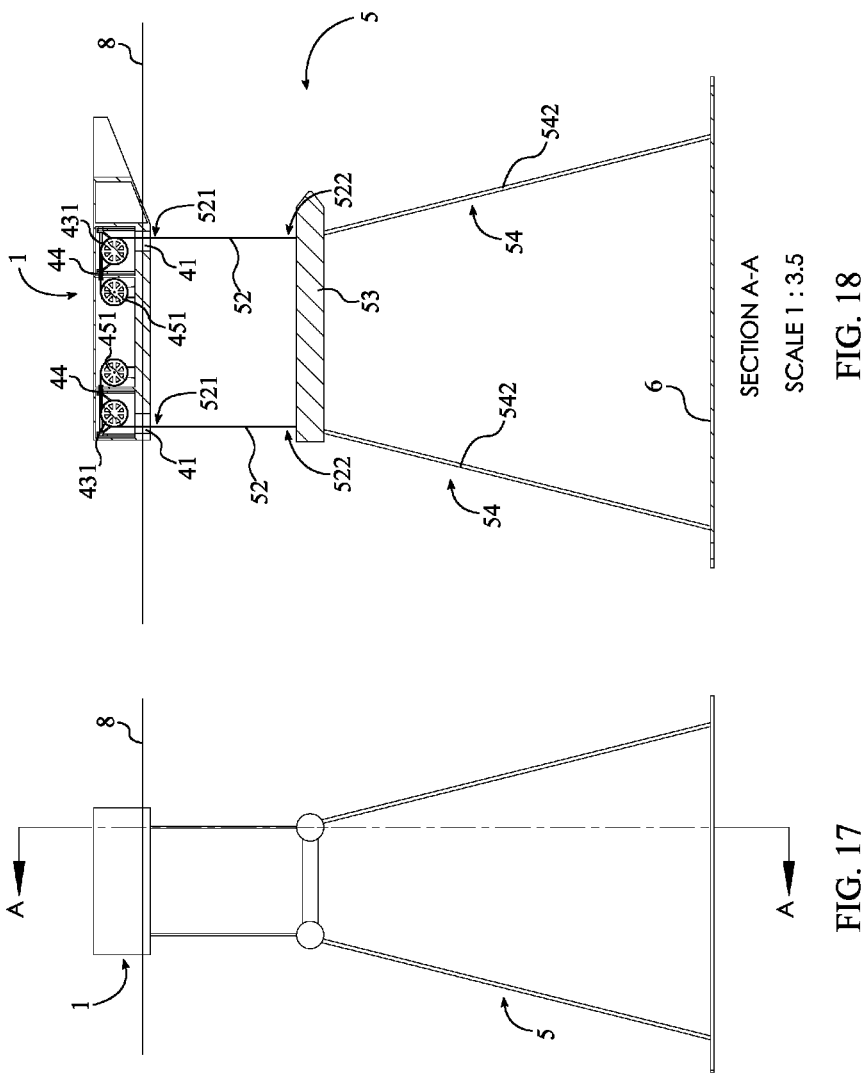

APPARATUS OF WAVE GENERATORS AND A MOORING SYSTEM TO GENERATE ELECTRICITY

The current application claims a priority to the U.S. Provisional Patent application Ser. No. 61/862,338 filed on Aug. 5, 2013.

FIELD OF THE INVENTION

The present invention relates generally to power generation. More specifically, a floating hull and an anti-drift mooring system of the present invention collectively convert the marine wave forces into electrical energy.

BACKGROUND OF THE INVENTION

There are many sources of hydro-electric generating potential found in the moving water of rivers, tidal estuaries, and the oceans. The largest of all hydro-electric potential is found in the oceans in the form ocean current and ocean waves. The present invention focuses on harnessing the ocean wave energy. One of the unique methods of hydroelectric generation is to utilize the movement of marine waves. Marine waves are generated by the winds. The longer the distance over which the wind blows (also known as the fetch), the higher the wind velocity and the longer the duration of wind, the higher the waves. In some areas of the world the waves are normally very high because of the favorable wave making conditions. The normally high wave areas are likely to produce the best development economics for wave power generation. These large waves are found in deepwater harsh open ocean areas. The present invention can operate in these harsh open ocean areas from shallow water to ultra deep water opening up the power of most of the oceans to provide virtually unlimited renewable energy for the future without harming the environment.

Even though there are some hydro electric generators which use marine waves to produce power, most of these hydro electric generators are not able to capture significant amounts of wave energy due to their relatively small surface areas of wave exposure. Most of these generators limit the size of these surface areas due to the large forces that will be imposed on the system under maximum 100 year storm conditions so that the large forces don't damage the system.

It is therefore an objective of the present invention to provide a large floating hull and mooring system able to provide significant power in most water depths and still have the ability to survive maximum 100 year storm events. A light minimum draft low drag coefficient floating object on the ocean's surface, like a life raft, is not move horizontally a significant distance by sinusoidal oceans waves but is moved up and down on the crest of these waves. Horizontally movement of such an object is attributed to the oceans currents and ocean winds. The greatest contributor to horizontal drift is the wind; therefore, a hull with minimum wind area and a low wind drag coefficient will also be subjected to minimum drift forces. This horizontal movement, often referred to as drift, is normally resisted by the use of an anchor, and is often referred to as a mooring system.

This invention uses a large light floating near flat bottom hull which is easily moved up and down dynamically by ocean waves. The vertical force on the bottom of the hull is transferred into the hull's vertical mooring legs. The vertical mooring legs turn the generators and the flywheels as the hull is lifted by the waves. The flywheels keep the generators turning as the hull descends on the trough of the waves. Hull drift is resisted by the horizontal components of force in the near vertical mooring system or by various forms of near horizontal moorings. The best horizontal moorings minimize vertical load components on the hull allowing free hull vertical movement while preventing horizontal drift.

BRIEF DESCRIPTION OF THE DRAWINGS

FIG. 11 is a side view of the present invention with the second configuration of the first embodiment of the anti-drift mooring system, showing the plane upon which a cross sectional view is taken shown in FIG. 12.

FIG. 12 is a cross section view thereof taken along line A-A of FIG. 11.

FIG. 17 is a side view of the present invention with the second configuration of the second embodiment of the anti-drift mooring system, showing the plane upon which a cross sectional view is taken shown in FIG. 18.

FIG. 18 is a cross section view thereof taken along line A-A of FIG. 17.

DETAIL DESCRIPTIONS OF THE INVENTION

Figure 1:
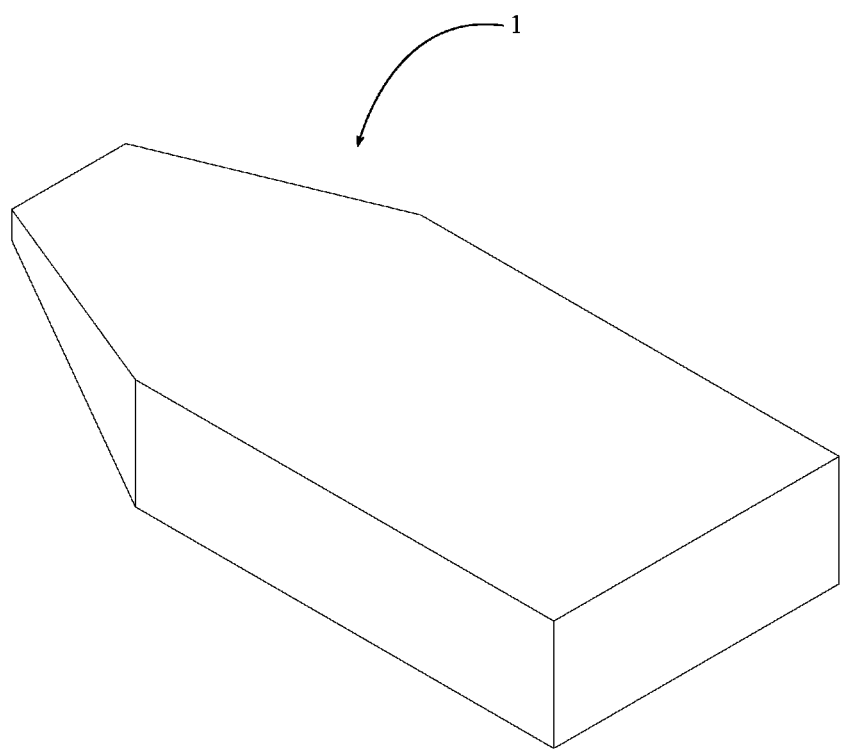
FIG. 1 is a perspective view of the floating hull of the present invention.

All illustrations of the drawings are for the purpose of describing selected versions of the present invention and are not intended to limit the scope of the present invention.

The present invention is an apparatus of wave generators and a mooring system used to generate electricity, where the present invention comprises a floating hull 1 and an anti-drift mooring system 5. The present invention is able to harness marine wave forces so that the vertical wave forces can be converted into the electricity through the present invention. The generated electricity of the present invention can be transported into electricity distribution centers through underwater electricity cables or overhead electricity cables. The floating hull 1 which comprises a barge 2, a watertight enclosure 3, and a plurality of generator mechanisms 4 is tensionably coupled with a subsurface environment 6 by the anti-drift mooring system 5 in near vertical direction, where the subsurface environment 6 can be a seabed, a subsurface structure or any other underwater surface. Since the floating hull 1 does not extend much above the water surface and is difficult to see from shore, the present invention is an ideal apparatus for near shore as well as remote offshore applications.

Figure 2:
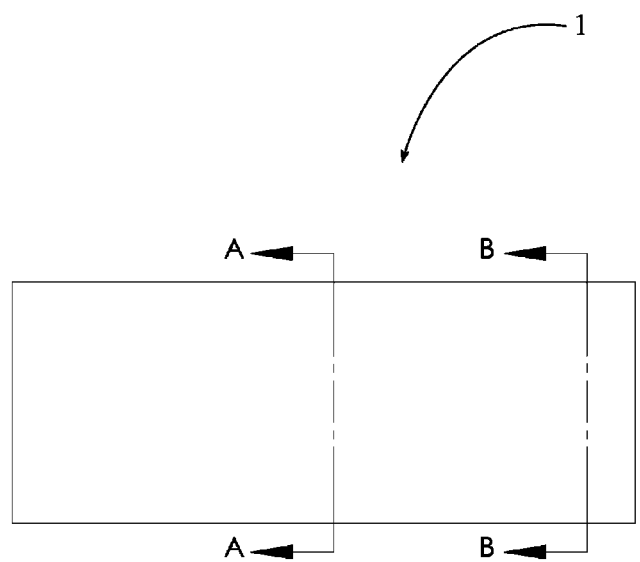
FIG. 2 is a side view of the floating hull of the present invention, showing the plane upon which cross sectional views are taken shown in FIG. 3 and FIG. 4.

In reference to FIG. 1 and FIG. 2, the floating hull 1 preferably made into a rectangular shape with a tapered section. The tapered section minimizes the horizontal wave forces and maximizes the vertical forces on the floating hull 1. The barge 2 functions as the floating vessel within the present invention providing a large horizontal surface area for vertical wave forces to react against and provides support for related components of the present invention. The barge 2 heaves more than any other form of floating vessel due to its near flat bottom and high vertical drag coefficient. Even though a rectangular shaped barge 2 is used within the preferred embodiment of the present invention, the barge 2 can be of almost any geometric shape known to the art of floating vessels. In reference to FIG. 5, the watertight enclosure 3 is positioned on the barge 2, where the watertight enclosure 3 provides a sealed compartment so that water does not flow into the watertight enclosure 3. The plurality of generator mechanisms 4 is perimetrically positioned around the barge 2 in such way that the watertight enclosure 3 surrounds the plurality of generator mechanisms 4.

Figure 3:
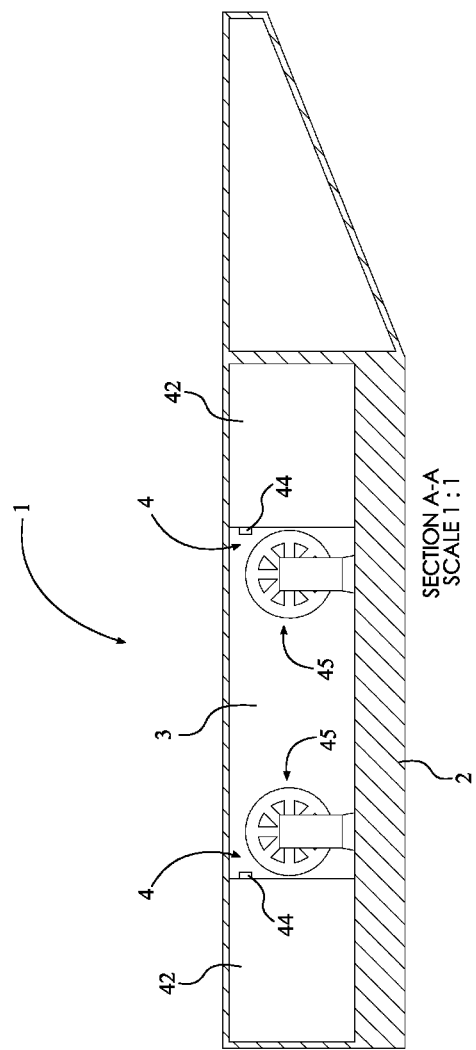
FIG. 3 is a cross section view thereof taken along line A-A of FIG. 2.
Figure 4:
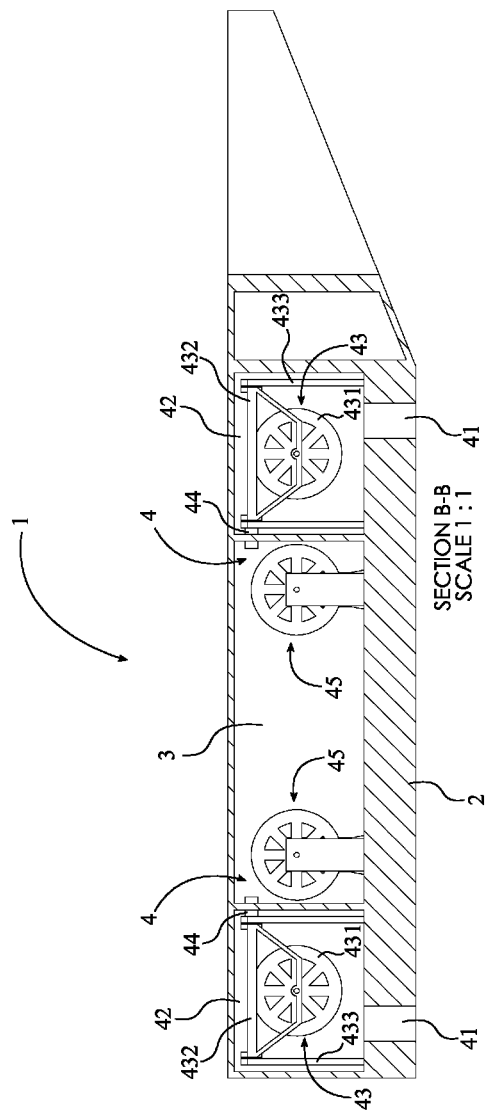
FIG. 4 is a cross section view thereof taken along line B-B of FIG. 2.

In reference to FIG. 3 and FIG. 4, each of the plurality of generator mechanisms 4 comprises an opening 41, a wet room 42, an articulated pulley system 43, a watertight gasket 44, and a wave generator unit 45. The opening 41 is perpendicularly traversed through the barge 2 creating a complete pass through within the barge 2. The wet room 42 is positioned on the barge 2 adjacent to the opening 41 so that the water is confined to only the wet room 42 through the opening 41. The watertight gasket 44 is extended from the wet room 42 to the watertight enclosure 3 providing a cavity to the watertight enclosure 3 from the wet room 42 in such way the watertight gasket 44 seals the wet room 42 from the watertight enclosure 3. Due to the structural integrity and the configuration of the watertight gasket 44, splashed water within the wet room 42 does not flow into the watertight enclosure 3 through watertight gasket 44.

The articulated pulley system 43 allows the mooring system 5 to vary as the floating hull 1 is moved by the waves keeping the anti-drift mooring system 5 within the confines of the articulated pulley system 43 and minimizing out-of-plane loads on the anti-drift mooring system 5 which in turn minimizes fatigue and wear of the anti-drift mooring system 5. The articulated pulley system 43 that comprises an articulated pulley 431, a pivotable arm 432, and a base frame 433 is positioned on the barge 2 and within the wet room 42 adjacent to the opening 41. More specifically, the base frame 433 is permanently connected to the barge 2 within the wet room 42, and the pivotable arm 432 is hingedly connected with the base frame 433 as the articulated pulley 431 rotatably connects with the pivotable arm 432.

Figure 5:
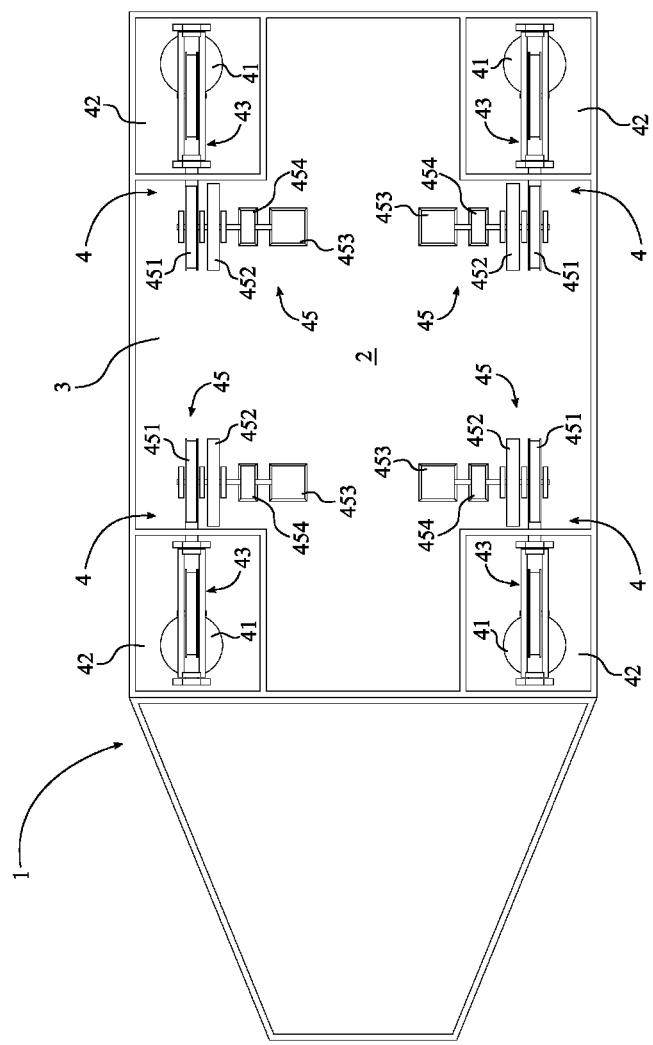
FIG. 5 is a top view of the floating hull of the present invention, showing the gearbox configuration of the present invention.
Figure 6:
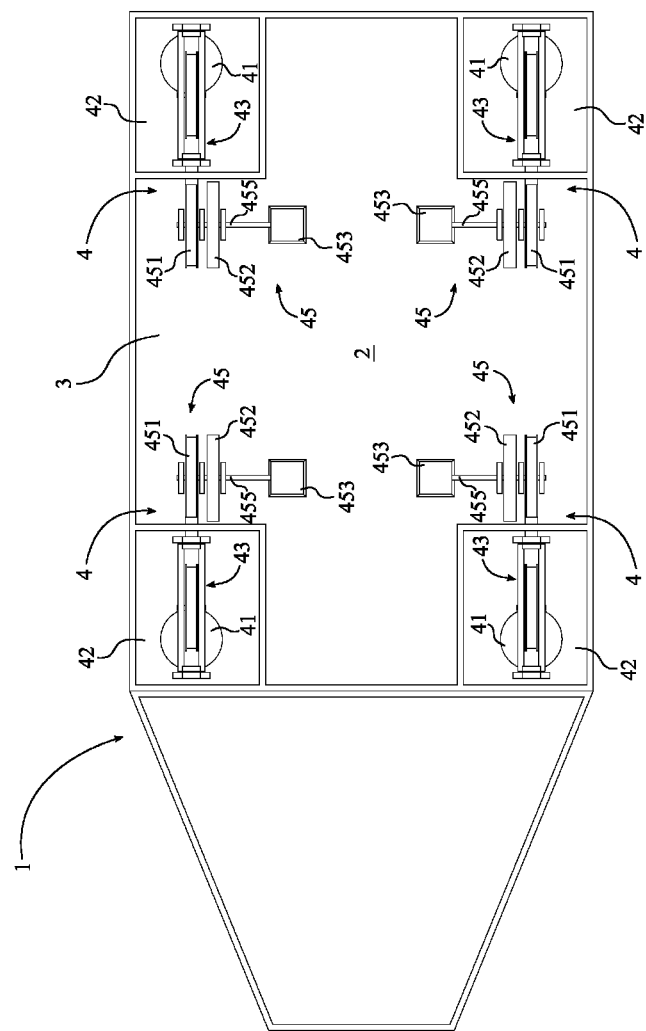
FIG. 6 is a top view of the floating hull of the present invention, showing the direct-drive configuration of the present invention.

The wave generator unit 45 is positioned within the watertight enclosure 3 adjacent to the wet room 42, where the wave generator unit 45 comprises an uni-directional recoiling pulley 451, a flywheel 452, and an electric generator 453. Within the present invention, the wave generator unit 45 can be configured into a first configuration and a second configuration. The first configuration is shown in FIG. 5, where the uni-directional recoiling pulley 451 is axially connected with the flywheel 452, and the flywheel 452 is axially connected with the electric generator 453 through a gearbox 454. The second configuration is shown in FIG. 6, where the uni-directional recoiling pulley 451 is axially connected with the flywheel 452, and the flywheel 452 is axially connected with the electric generator 453 through a direct-drive system 455. Since the wave generator units 45 are positioned within the watertight enclosure 3, the watertight enclosure 3 further protects the wave generator units 45 from external environmental conditions. Depending on different embodiments, the watertight enclosure 3 may also provide a compartment door so that the wave generator units 45 and all of their associated sensitive equipments can be repaired and maintained without the need to disconnect them from the anti-drift mooring system 5 and the need to tow the floating hull 1 to shore. Even though the preferred embodiment of the present invention utilizes rotary armature generators as the electric generators 453, the present invention can also used linear armature generators as the electric generators 453 along with at least one secondary counterweight.

The anti-drift mooring system 5 can comprise different embodiments depending on the water depth, the normal wave heights, the environmental regulations, and the subsurface environment 6. Each of the different embodiments of the anti-drift mooring system 5 allows the floating hull 1 to be moored in optimum configuration for a particular set of circumstances so that the efficiency of the wave generator unit 45 can be maximized through the anti-drift mooring system 5.

Figure 7:
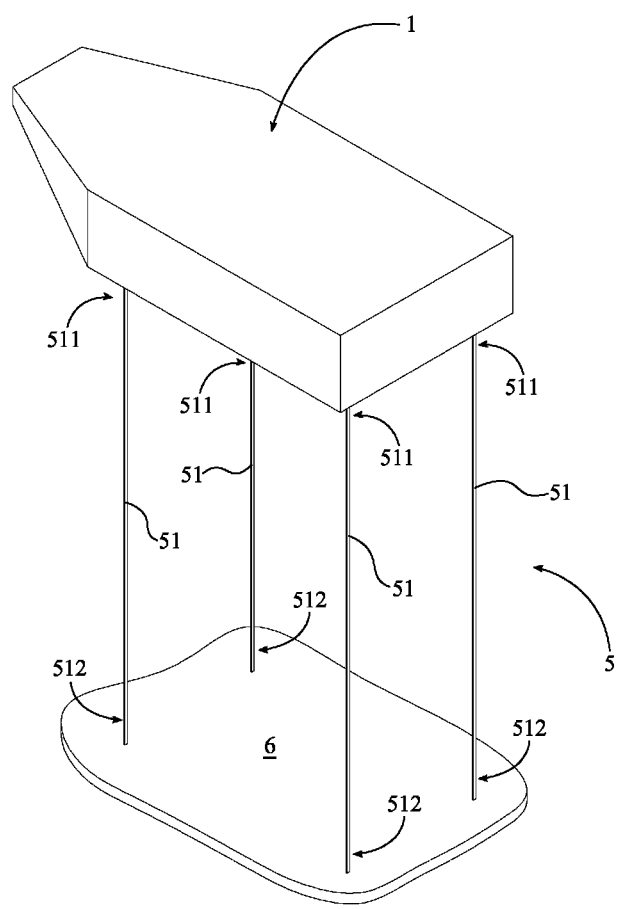
FIG. 7 is a perspective view of the present invention, showing the first configuration of the first embodiment of the anti-drift mooring system.
Figure 9:
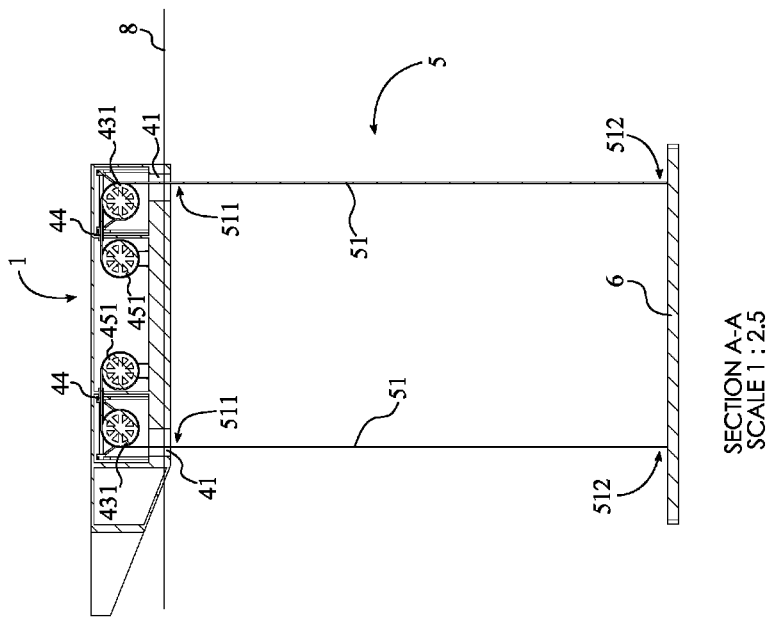
FIG. 9 is a cross section view thereof taken along line A-A of FIG. 8.
Figure 8:
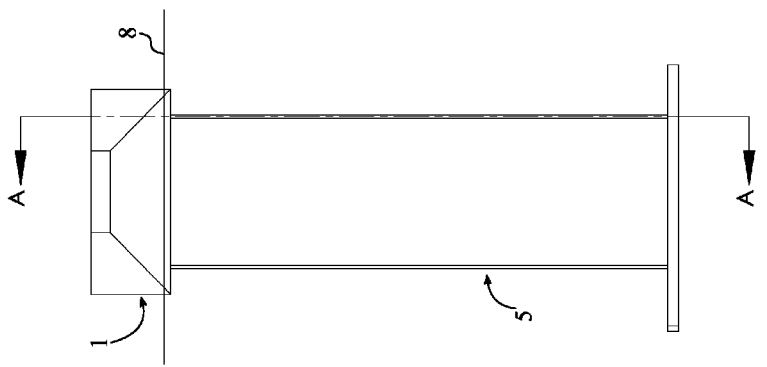
FIG. 8 is a side view of the present invention with the first configuration of the first embodiment of the anti-drift mooring system, showing the plane upon which a cross sectional view is taken shown in FIG. 9.
Figure 10:
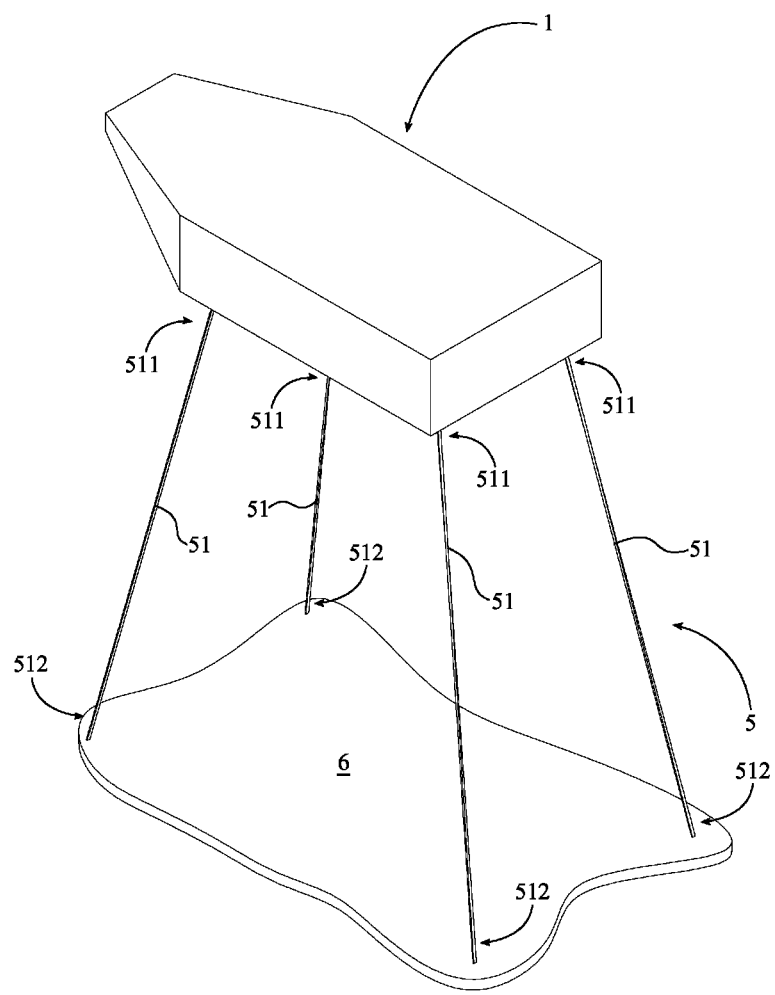
FIG. 10 is a perspective view of the present invention, showing the second configuration of the first embodiment of the anti-drift mooring system.

In reference to FIG. 7-FIG. 12, the first embodiment of the anti-drift mooring system 5 comprises a plurality of tension mooring legs 51. Each of the plurality of tension mooring legs 51 comprises a first end 511 and a second end 512, where the first end 511 and the second end 512 are oppositely positioned from each other along each of the plurality of tension mooring legs 51. The first end 511 for each of the plurality of tension mooring legs 51 is tangentially connected with the uni-directional recoiling pulley 451 of a corresponding generator mechanism, wherein the plurality of generator mechanisms 4 includes the corresponding generator mechanism. More specifically, the first end 511 for each of the plurality of tension mooring legs 51 is traversed through the watertight gasket 44 of the corresponding generator mechanism as the first end 511 perimetrically engages around the articulated pulley 431 and traverses through the opening 41 of the corresponding generator mechanism. The second end 512 for each of the plurality of tension mooring legs 51 is connected with the subsurface environment 6 completing the anti-drift mooring system 5 of the first embodiment, where the second end 512 can be connected with two different configurations. A first configuration for the first embodiment of the anti-drift mooring system 5 is shown in FIG. 7, where the plurality of tension mooring legs 51 is vertically positioned in between the barge 2 and the subsurface environment 6. A second configuration for the first embodiment of the anti-drift mooring system 5 is shown in FIG. 10, where the plurality of tension mooring legs 51 is angularly positioned in between the barge 2 and the subsurface environment 6.

Figure 13:
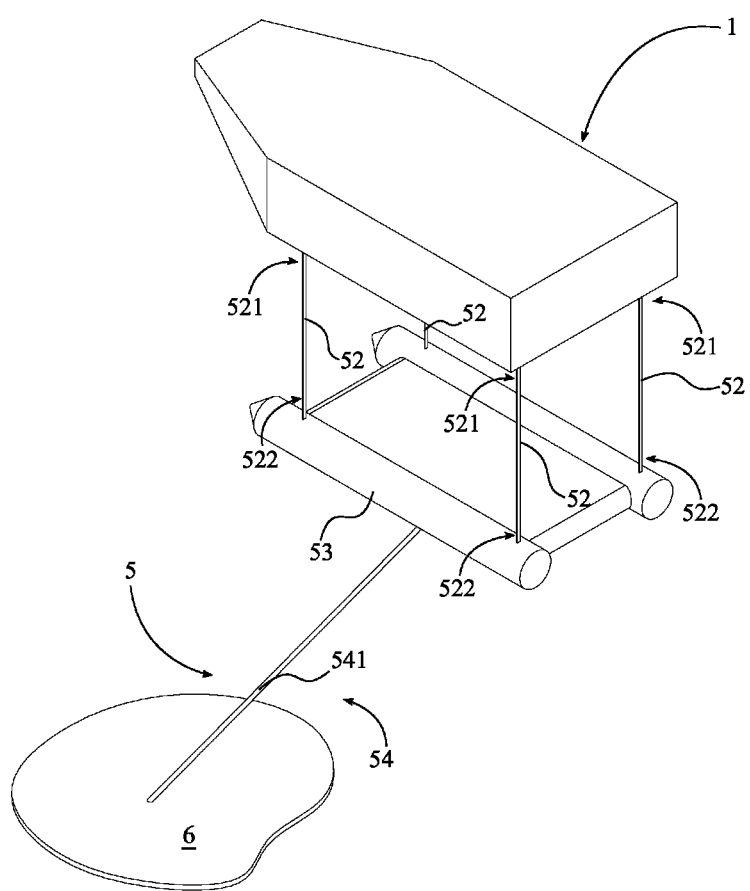
FIG. 13 is a perspective view of the present invention, showing the first configuration of the second embodiment of the anti-drift mooring system.
Figure 15:
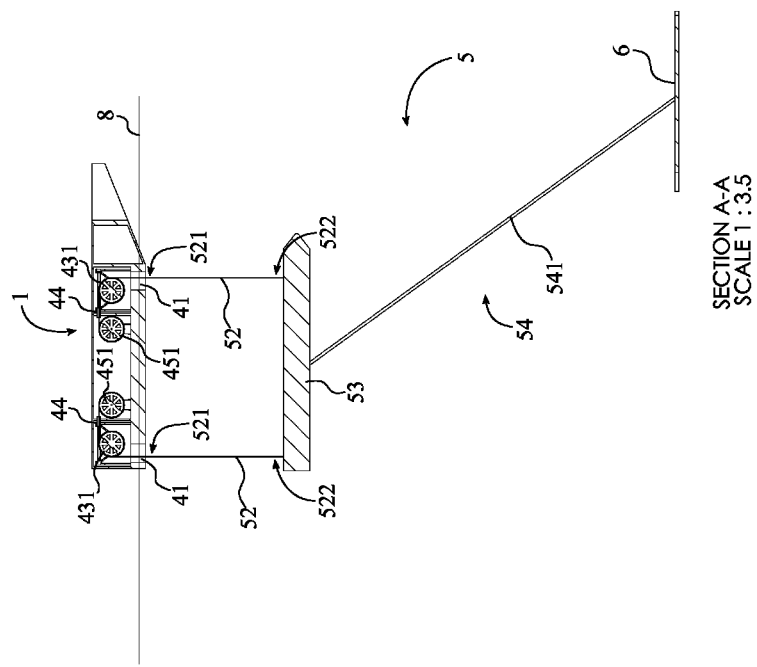
FIG. 15 is a cross section view thereof taken along line A-A of FIG. 14.
Figure 14:
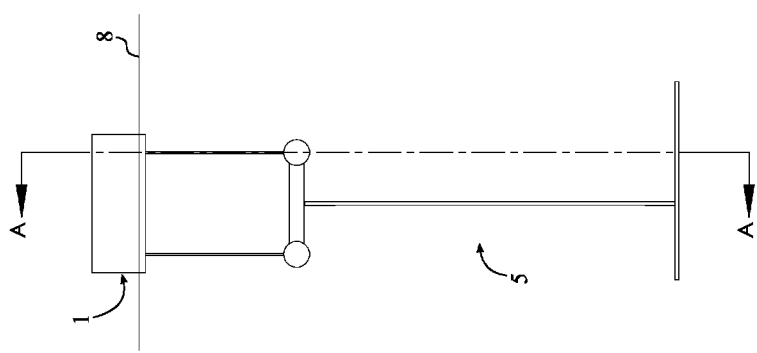
FIG. 14 is a side view of the present invention with the first configuration of the second embodiment of the anti-drift mooring system, showing the plane upon which a cross sectional view is taken shown in FIG. 15.
Figure 16:
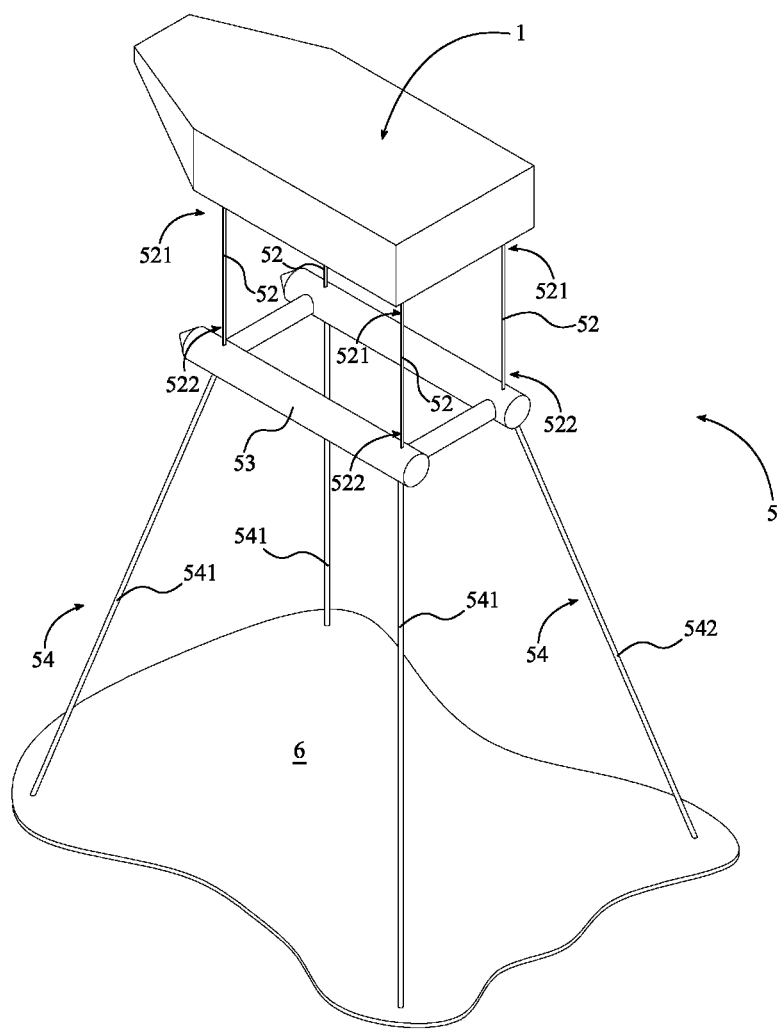
FIG. 16 is a perspective view of the present invention, showing the second configuration of the second embodiment of the anti-drift mooring system.

In reference to FIG. 13-FIG. 18, the second embodiment of the anti-drift mooring system 5 comprises a plurality of vertical mooring lines 52, a submerged structure 53, and at least one mooring line 54. Each of the plurality of vertical mooring lines 52 comprises a top end 521 and a bottom end 522, where the top end 521 and the bottom end 522 are oppositely positioned from each other along each of the plurality of vertical mooring lines 52. The top end 521 for each of the plurality of vertical mooring lines 52 is tangentially connected with the uni-directional recoiling pulley 451 of a corresponding generator mechanism, wherein the plurality of generator mechanisms 4 includes the corresponding generator mechanism. More specifically, the top end 521 for each of the plurality of vertical mooring lines 52 is traversed through the watertight gasket 44 of the corresponding generator mechanism as the top end 521 perimetrically engages around the articulated pulley 431 and traverses through the opening 41 of the corresponding generator mechanism. The bottom end 522 for each of the plurality of vertical mooring lines 52 is connected with the submerged structure 53 as the submerged structure 53 functions as an anchor for the floating hull 1. The submerged structure 53 is connected with the subsurface environment 6 by the at least one mooring line 54, completing the anti-drift mooring system 5 of the second embodiment, where the at least one mooring line 54 can be connected with two different configurations. A first configuration for the second embodiment of the anti-drift mooring system 5 is shown in FIG. 13, where the at least one mooring line 54 is positioned in between the barge 2 and the subsurface environment 6 as a catenary mooring line 541. A second configuration for the second embodiment of the anti-drift mooring system 5 is shown in FIG. 16, where the at least one mooring line 54 is positioned in between the barge 2 and the subsurface environment 6 as a plurality of taunt mooring lines 542.

Figure 19:
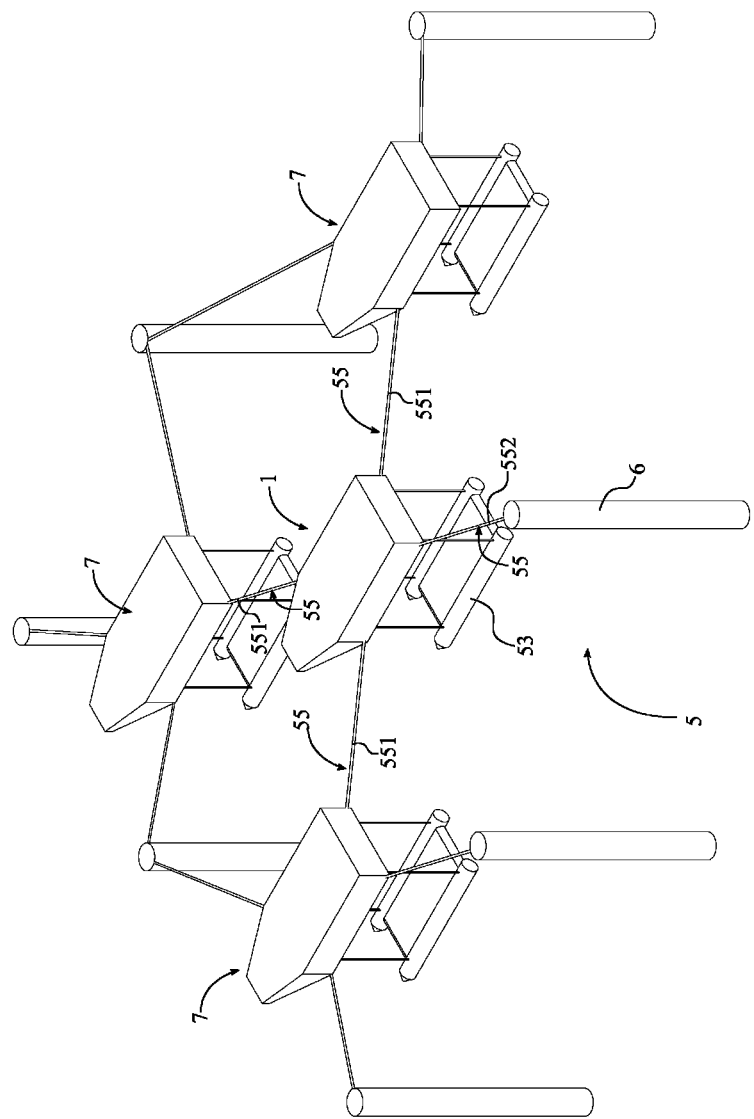
FIG. 19 is a perspective view of the present invention, showing the third embodiment of the anti-drift mooring system.
Figure 20:
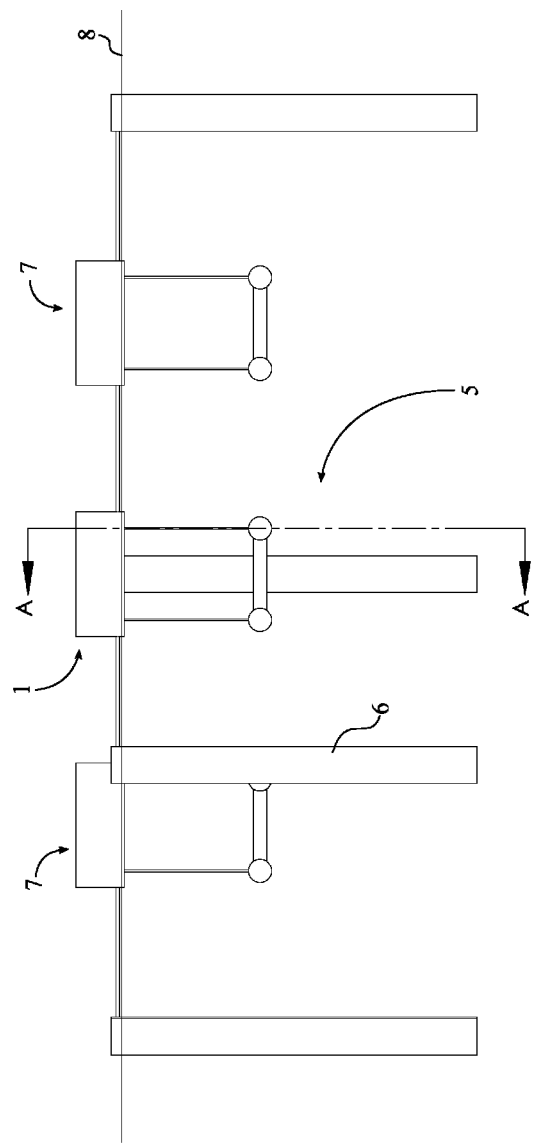
FIG. 20 is a side view of the present invention with the third embodiment of the anti-drift mooring system, showing the plane upon which a cross sectional view is taken shown in FIG. 21.
Figure 21:
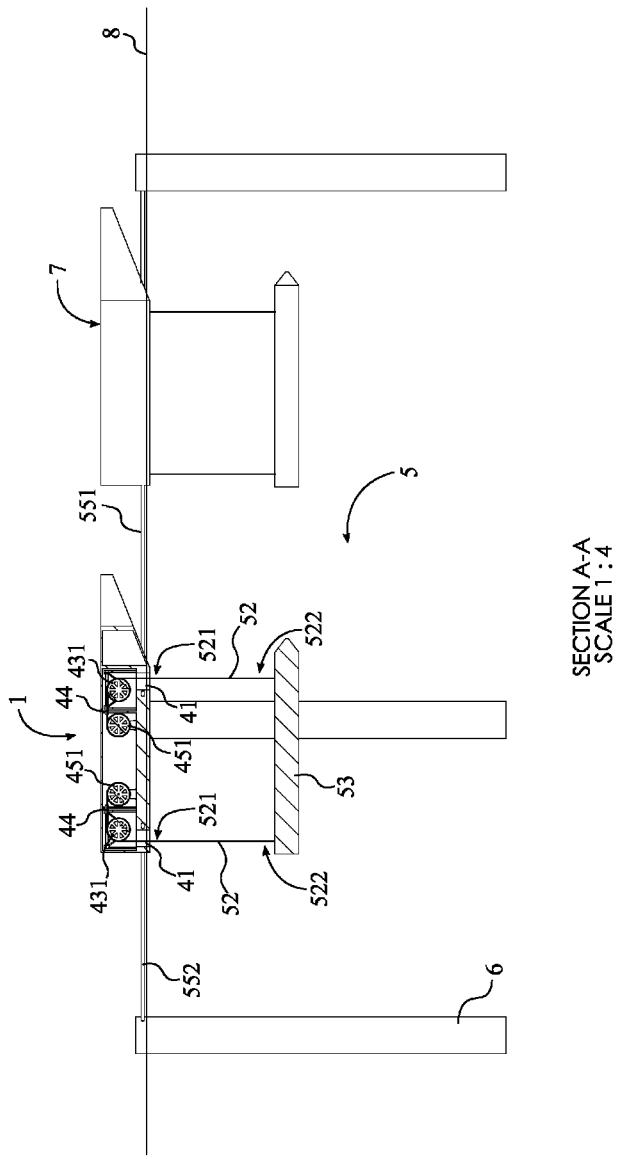
FIG. 21 is a cross section view thereof taken along line A-A of FIG. 20.

In reference to FIG. 19-FIG. 21, the third embodiment of the anti-drift mooring system 5 comprises the plurality of vertical mooring lines 52, the submerged structure 53, and a plurality of horizontal mooring lines 55. Each of the plurality of vertical mooring lines 52 comprises a top end 521 and a bottom end 522, where the top end 521 and the bottom end 522 are oppositely positioned from each other along each of the plurality of vertical mooring lines 52. The top end 521 for each of the plurality of vertical mooring lines 52 is tangentially connected with the uni-directional recoiling pulley 451 of a corresponding generator mechanism, wherein the plurality of generator mechanisms 4 includes the corresponding generator mechanism. More specifically, the top end 521 for each of the plurality of vertical mooring lines 52 is traversed through the watertight gasket 44 of the corresponding generator mechanism as the top end 521 perimetrically engages around the articulated pulley 431 and traverses through the opening 41 of the corresponding generator mechanism. The bottom end 522 for each of the plurality of vertical mooring lines 52 is connected with the submerged structure 53 as the submerged structure 53 functions as a foundation for the plurality of vertical mooring lines 52. The plurality of horizontal mooring lines 55 comprises a plurality of connecting lines 551 and at least one structural line 552. More specifically, the plurality of horizontal mooring lines 55 is perimetrically positioned around the floating hull 1 in such way that the floating hull 1 connects with the subsurface environment 6 by the at least one structural line 552 and connects with a plurality of surrounding floating hulls 7 by the plurality of connecting lines 551. The plurality of connecting lines 551 of the third embodiment of the anti-drift mooring system 5 allows the present invention to create a wave generation farm system as the plurality of connecting lines 551 connects the plurality of surrounding floating hulls 7 with the floating hull 1 while the wave generation farm system is kept stationary by the at least one structural line 552.

Figure 22:
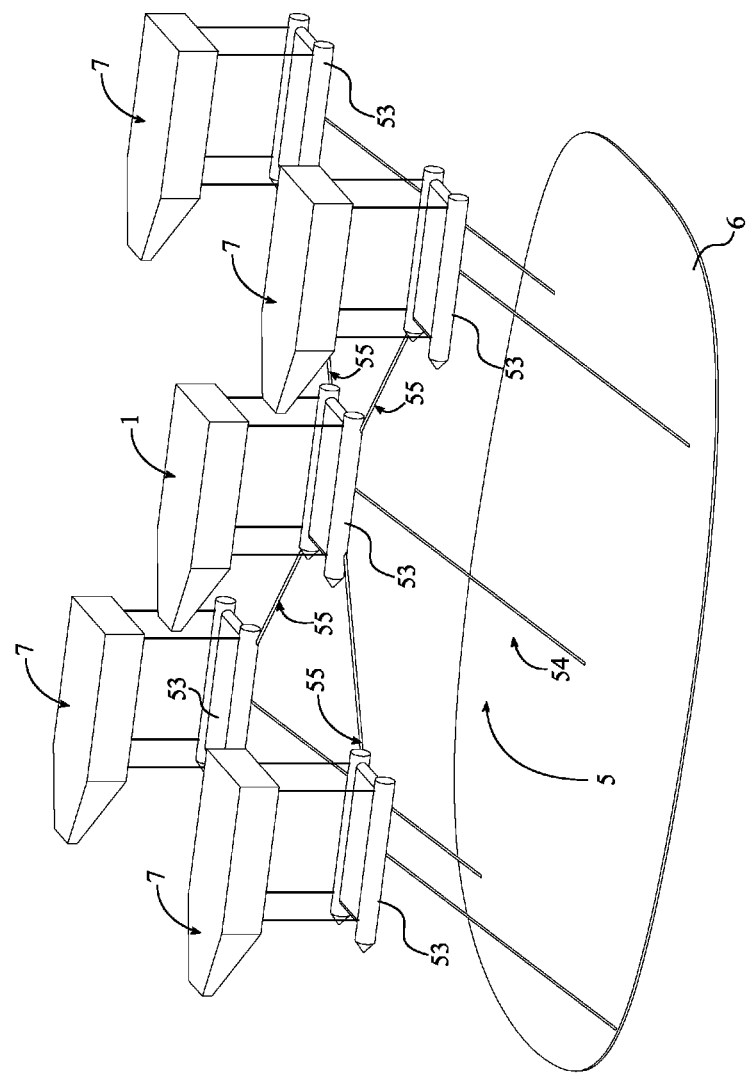
FIG. 22 is a perspective view of the present invention, showing the fourth embodiment of the anti-drift mooring system.
Figure 23:
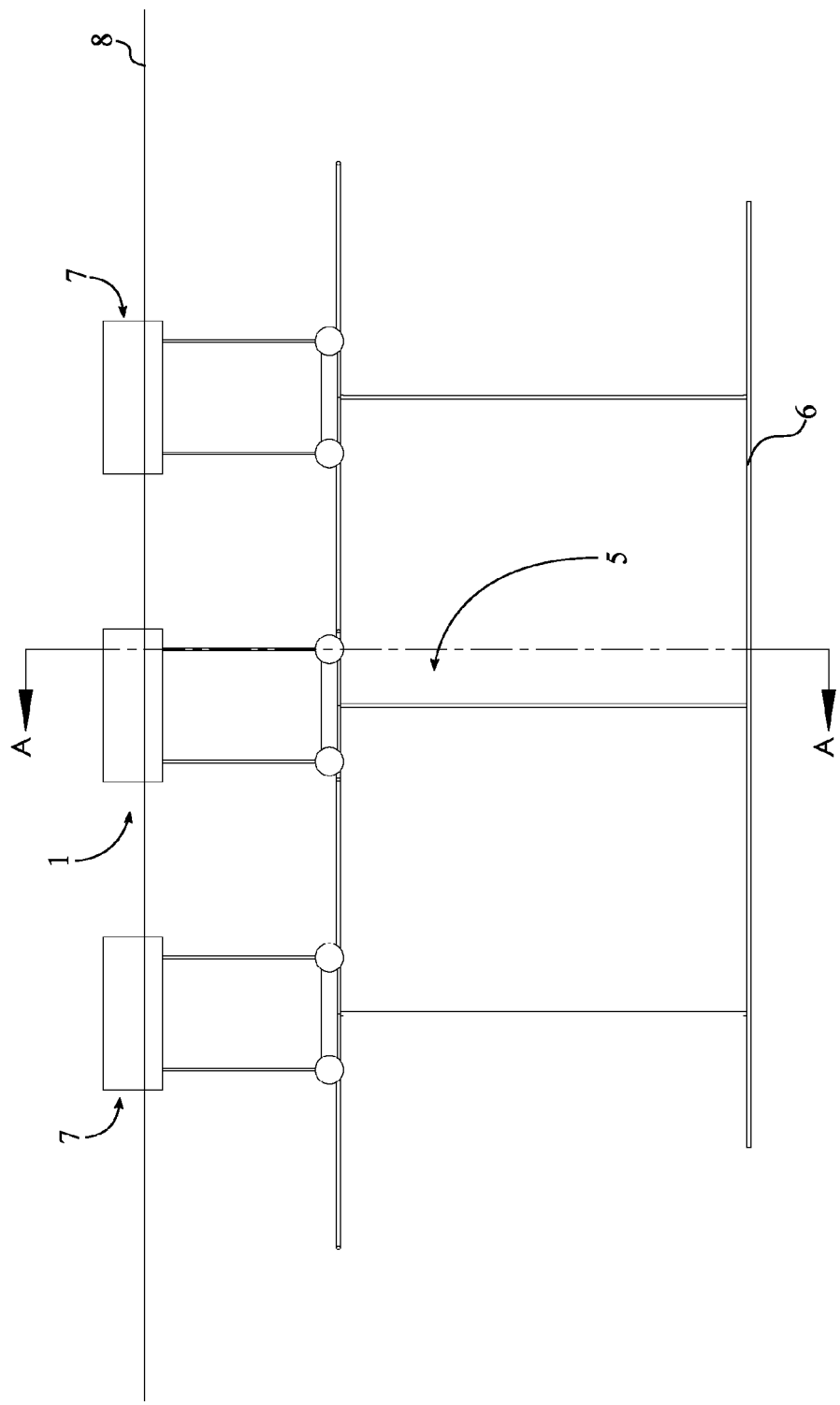
FIG. 23 is a side view of the present invention with the fourth embodiment of the anti-drift mooring system, showing the plane upon which a cross sectional view is taken shown in FIG. 24.
Figure 24:
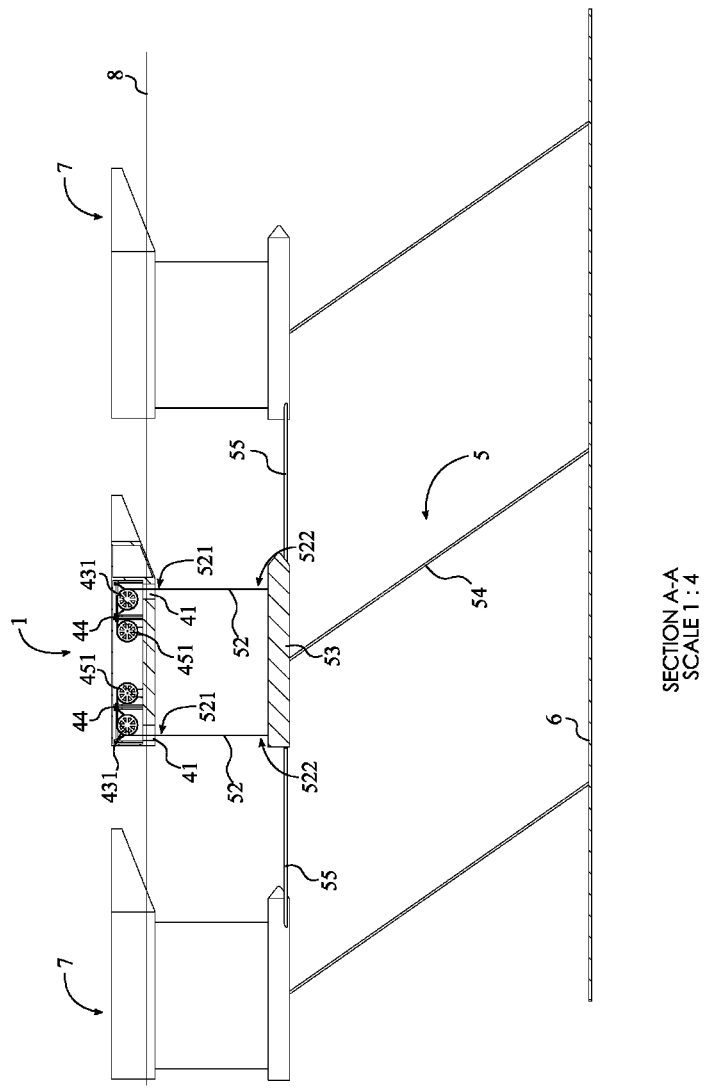
FIG. 24 is a cross section view thereof taken along line A-A of FIG. 23.

In reference to FIG. 22-FIG. 24, the fourth embodiment of the anti-drift mooring system 5 comprises the plurality of vertical mooring lines 52, the submerged structure 53, at least one mooring line 54, and the plurality of horizontal mooring lines 55. Each of the plurality of vertical mooring lines 52 comprises a top end 521 and a bottom end 522, where the top end 521 and the bottom end 522 are oppositely positioned from each other along each of the plurality of vertical mooring lines 52. The top end 521 for each of the plurality of vertical mooring lines 52 is tangentially connected with the uni-directional recoiling pulley 451 of a corresponding generator mechanism, wherein the plurality of generator mechanisms 4 includes the corresponding generator mechanism. More specifically, the top end 521 for each of the plurality of vertical mooring lines 52 is traversed through the watertight gasket 44 of the corresponding generator mechanism as the top end 521 perimetrically engages around the articulated pulley 431 and traverses through the opening 41 of the corresponding generator mechanism. The bottom end 522 for each of the plurality of vertical mooring lines 52 is connected with the submerged structure 53 as the submerged structure 53 functions as a counterweight for the floating hull 1. The submerged structure 53 is connected with the subsurface environment 6 by the at least one mooring line 54 as the at least one mooring line 54 functions as the catenary mooring line 541. The plurality of horizontal mooring lines 55 is perimetrically positioned around the submerged structure 53 in such way that the submerged structure 53 connects with the plurality of surrounding floating hulls 7 by the plurality horizontal mooring lines 55. The plurality horizontal mooring lines 55 of the fourth embodiment of the anti-drift mooring system 5 allows the present invention to create a wave generation farm system as the plurality horizontal mooring lines 55 connects the plurality of surrounding floating hulls 7 to the submerged structure 53 while the wave generation farm system is kept stationary by the at least one mooring line 54.

Figure 25:
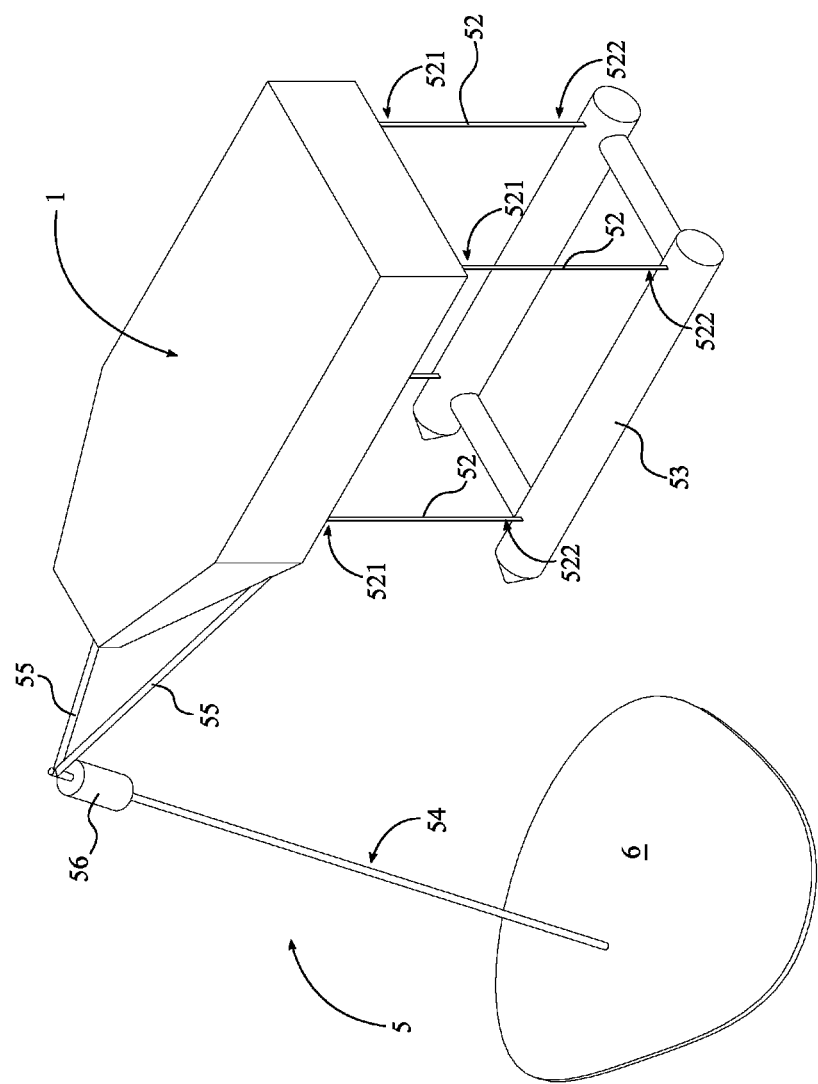
FIG. 25 is a perspective view of the present invention, showing the fifth embodiment of the anti-drift mooring system.
Figures 26, 27:
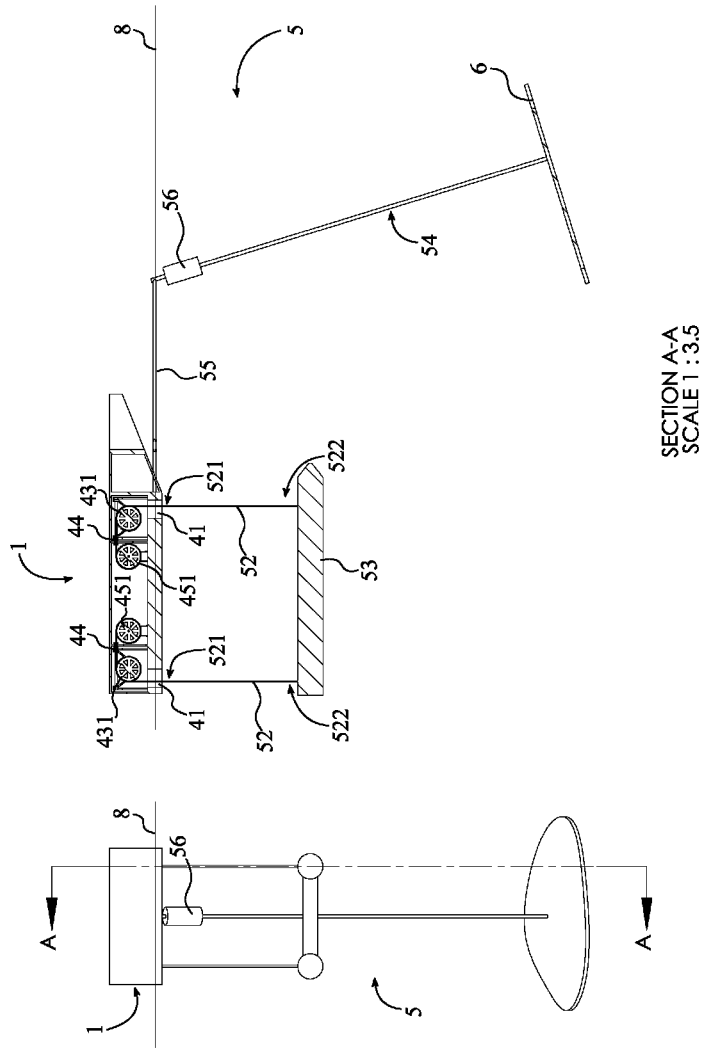
FIG. 26 is a side view of the present invention with the fifth embodiment of the anti-drift mooring system, showing the plane upon which a cross sectional view is taken shown in FIG. 27.
FIG. 27 is a cross section view thereof taken along line A-A of FIG. 26.
Figure 28:
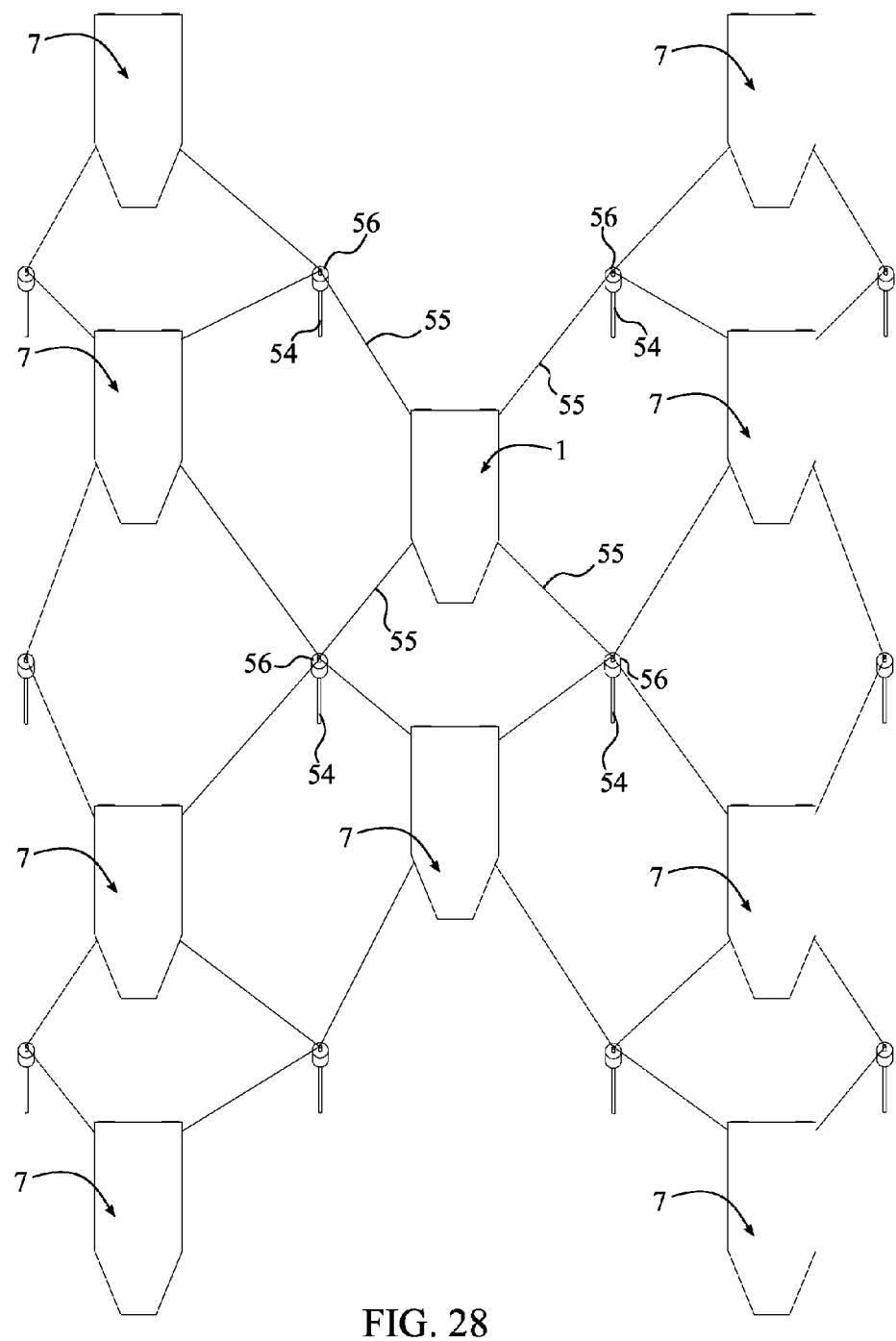
FIG. 28 is a top view of the farm system of the present invention along with the fifth embodiment of the anti-drift mooring system.

In reference to FIG. 25-FIG. 27, the fifth embodiment of the anti-drift mooring system 5 comprises the plurality of vertical mooring lines 52, the submerged structure 53, the plurality of horizontal mooring lines 55, at least one spring buoy 56, and the at least one mooring line 54. Each of the plurality of vertical mooring lines 52 comprises a top end 521 and a bottom end 522, where the top end 521 and the bottom end 522 are oppositely positioned from each other along each of the plurality of vertical mooring lines 52. The top end 521 for each of the plurality of vertical mooring lines 52 is tangentially connected with the uni-directional recoiling pulley 451 of a corresponding generator mechanism, wherein the plurality of generator mechanisms 4 includes the corresponding generator mechanism. More specifically, the top end 521 for each of the plurality of vertical mooring lines 52 is traversed through the watertight gasket 44 of the corresponding generator mechanism as the top end 521 perimetrically engages around the articulated pulley 431 and traverses through the opening 41 of the corresponding generator mechanism. The bottom end 522 for each of the plurality of vertical mooring lines 51 is connected with the submerged structure 53 as the submerged structure 53 functions as a counterweight for the floating hull 1. The plurality of horizontal mooring lines 55 is perimetrically positioned around the floating hull 1 in such way that the floating hull 1 is connected with the at least one spring buoy 56 by the plurality of horizontal mooring lines 55. Additionally, at least one of the horizontal mooring line 55 of the fifth embodiment of anti-drift mooring system 5 needs to be a rigid member so that the floating hull 1 does not impact with the at least one spring buoy 56 in slack environmental conditions while other horizontal mooring lines 55 of the fifth embodiment of anti-drift mooring system 5 can be conventional flexible members. The at least one spring buoy 56 is connected with the subsurface environment 6 by the at least one mooring line 54, where the at least one spring buoy 56 and the at least one mooring line 54 allow the floating hull 1 to naturally weathervane for optimal performance. The at least one spring buoy 56 normally submerges below the water surface under normal environment, resulting a minimum wave energy losses for the floating hull 1. In reference to FIG. 28, the fifth embodiment of the anti-drift mooring system 5 further comprises a plurality of surrounding floating hulls 7 that is held in position by the at least one mooring line 54 and the corresponding horizontal mooring lines 55. More specifically, the plurality of surrounding floating hulls 7 interconnects with the at least one spring buoy 56 by the corresponding horizontal mooring lines 55 of the plurality of surrounding floating hulls 7. This results in a wave generation farm system for the fifth embodiment of the anti-drift mooring system 5.

The submerged structure 53 of the anti-drift mooring system 5 can be a counterweight, a sea anchor, a pre-installed underwater structure, or an underwater frame, where the submerged structure 53 is subjected to minimum marine wave forces. For example, the submerged structure 53 can be positively buoyant with the at least one mooring line 54 that is connected to the subsurface environment 6 and always remains in tension. The submerged structure 53 preferably utilizes in high depth conditions as the submerged structure 53 allows the plurality of vertical mooring lines 52 of the floating hull 1 to be near vertical and short for rapid connection to pre-installed submerged structure 53. More specifically, the submerged structure 53 is made to have slightly negative buoyancy by balancing its mass with its trapped buoyancy so that the inertia mass of and the high vertical drag coefficient of the submerged structure 53 prevent the submerged structure 53 from undergoing significant vertical movement. This allows the submerged structure 53 to remain almost stationary as the floating hull 1 moves down with the wave trough and moves up with the wave crest. When the submerged structure 53 functions as the sea anchor within the present invention, the submerged structure 53 preferably shaped into a flat surfaced submerged structure 53.

Since the plurality of tension mooring legs 51 or the plurality of vertical mooring lines 52 traverse though the openings 41, the openings 41 is of a sufficient diameter so that the plurality of tension mooring legs 51 or the plurality of vertical mooring lines 52 is able to move freely 360 degrees with respect to the horizontal movements of the floating hull 1. The plurality of tension mooring legs 51 or the plurality of vertical mooring lines 52 also imposes vertical restraint on the floating hull 1 through the resistance of the plurality of generator mechanisms 4 during the upward heave following a wave crest and maintains some tension through the uni-directional recoiling pulley 451 during the downward heave following the trough of the wave. The downward heave of the floating hull 1 rewinds the plurality of tension mooring legs 51 or the plurality of vertical mooring lines 52 on the uni-directional recoiling pulley 451 in readiness for the next wave crest. The articulated pulley systems 43 allows the plurality of tension mooring legs 51 or the plurality of vertical mooring lines 52 to have multi-directional vertical movement below the articulated pulley systems 43 and only horizontal directional movement about the articulated pulley systems 43. The resulting horizontal directional movement turns the uni-directional recoiling pulley 451, the flywheel 452, and the electric generator 453. When the floating hull 1 impacts with the wave crest, the floating hull 1 moves up along with the wave crest in such way that the pulling forces of the plurality of tension mooring legs 51 or the plurality of vertical mooring lines 52 turns the wave generator units 45, converting marine wave force into electricity within the present invention. When the floating hull 1 moves downward with the wave trough, the tension force of the plurality of tension mooring legs 51 or the plurality of vertical mooring lines 52 is maintained by recoil spring mechanism of the uni-directional recoiling pulleys 451 or the at least one secondary counterweight. If the wave generator units 45 use rotary armature generators as the electric generators 453, the tension force of the plurality of tension mooring legs 51 or the plurality of vertical mooring lines 52 is maintained by the recoil spring mechanisms. More specifically, the uni-directional pulley and the recoil spring mechanism of the uni-directional recoiling pulley 451 functions in a similar manner to the manual starter rope assembly on a common lawn mower. The recoil spring mechanism rewinds the plurality of tension mooring legs 51 or the plurality of vertical mooring lines 52 back onto the uni-directional recoiling pulley 451 when the plurality of tension mooring legs 51 or the plurality of vertical mooring lines 52 loose tension as the hull descends on the wave trough. If the wave generator units 45 use linear armature generators as the electric generators 453, the tension force of the plurality of tension mooring legs 51 or the plurality of vertical mooring lines 52 is maintained by the at least one secondary counterweight. More specifically, since the at least one secondary counterweight and the linear armature generators do not use the recoil spring mechanism and uses only the uni-directional pulley, the at least one secondary counterweight is either connected at the top ends 521 as the plurality of vertical mooring lines 52 positions around the uni-directional pulleys or at the first ends 511 as the plurality of vertical mooring lines 52 positions around the uni-directional pulley. Additionally, the flywheels 452 store potential energy as the wave crest lifts the floating hull 1 in upward direction, and the flywheels 452 release their energy to the electric generators 453 as the floating hulls 1 descend on the wave trough. Due to the continuous nature of marine wave forces, the present invention is able to continuously and efficiently generate electricity as the electric generators 453 are continuously turned through the plurality of tension mooring legs 51 or the plurality of vertical mooring lines 52 during the wave crests and through the flywheels 452 during the wave troughs.

Although the invention has been explained in relation to its preferred embodiment, it is to be understood that many other possible modifications and variations can be made without departing from the spirit and scope of the invention as hereinafter claimed.

What is claimed is:

1. An apparatus of wave generators and a mooring system is used to generate electricity comprises:
   a floating hull;
   an anti-drift mooring system;
   the floating hull comprises a barge, a watertight enclosure, a plurality of generator mechanisms;
   each of the plurality of generator mechanisms comprises an opening, a wet room, an articulated pulley system, a watertight gasket, and a wave generator unit;
   the articulated pulley system comprises an articulated pulley, a pivotable arm, and a base frame;
   the wave generator unit comprises a uni-directional recoiling pulley, a flywheel, and an electric generator; and
   the floating hull being tensionably coupled with the anti-drift mooring system.

2. The apparatus of wave generators and a mooring system to generate electricity as claimed in claim 1 comprises:
   the watertight enclosure being positioned on the barge; and
   the plurality of generator mechanisms being perimetrically positioned around the barge.

3. The apparatus of wave generators and a mooring system is used to generate electricity as claimed in claim 1 comprises:
   the opening perpendicularly traversing through the barge;
   the wet room being positioned on the barge adjacent to the opening;
   the articulated pulley system being positioned on the barge;
   the articulated pulley system being positioned within the wet room;
   the watertight gasket being extended from the wet room to the watertight enclosure;
   the wave generator unit being positioned within the watertight enclosure; and
   the wave generator unit being adjacently positioned with the wet room.

4. The apparatus of wave generators and a mooring system is used to generate electricity as claimed in claim 1 comprises:
   the base frame being permanently connected to the barge within the wet room;
   the pivotable arm being hingedly connected with the base frame; and
   the articulated pulley being rotatably connected with the pivotable arm.

5. The apparatus of wave generators and a mooring system is used to generate electricity as claimed in claim 1 comprises:
   the uni-directional recoiling pulley being axially connected with the flywheel; and
   the flywheel being axially connected with the electric generator through a gear box.

6. The apparatus of wave generators and a mooring system is used to generate electricity as claimed in claim 1 comprises:
   the uni-directional recoiling pulley being axially connected with the flywheel; and
   the flywheel being axially connected with the electric generator through a direct-drive system.

7. The apparatus of wave generators and a mooring system is used to generate electricity as claimed in claim 1 comprises:
   the anti-drift mooring system comprises a plurality of tension mooring legs;
   each of the plurality of tension mooring legs comprises a first end and a second end;
   the first end and the second end being oppositely positioned from each other along each of the plurality of tension mooring legs;
   the first end for each of the plurality of tension mooring legs being tangentially connected with the uni-directional recoiling pulley of a corresponding generator mechanism, wherein the plurality of generator mechanisms includes the corresponding generator mechanism;
   the first end for each of the plurality of tension mooring legs traversing through the watertight gasket of the corresponding generator mechanism;
   the first end for each of the plurality of tension mooring legs being perimetrically engaged around the articulated pulley of the corresponding generator mechanism;
   the first end for each of the plurality of tension mooring legs traversing through the opening of the corresponding generator mechanism; and
   the second end for each of the plurality of tension mooring legs being connected with a subsurface environment.

8. The apparatus of wave generators and a mooring system is used to generate electricity as claimed in claim 7, wherein the plurality of tension mooring legs being vertically positioned in between the barge and the subsurface environment.

9. The apparatus of wave generators and a mooring system is used to generate electricity as claimed in claim 7, wherein the plurality of tension mooring legs being angularly positioned in between the barge and the subsurface environment.

10. The apparatus of wave generators and a mooring system is used to generate electricity as claimed in claim 1 comprises:
    the anti-drift mooring system comprises a plurality of vertical mooring lines, a submerged structure, and at least one mooring line;
    each of the plurality of vertical mooring lines comprises a top end and a bottom end;
    the top end and the bottom end being oppositely positioned from each other along the vertical mooring line;
    the top end for each of the plurality of vertical mooring lines being tangentially connected with the uni-directional recoiling pulley of a corresponding generator mechanism, wherein the plurality of generator mechanisms includes the corresponding generator mechanism;
    the top end for each of the plurality of vertical mooring lines traversing through the watertight gasket of the corresponding generator mechanism;
    the top end for each of the plurality of vertical mooring lines being perimetrically engaged around the articulated pulley of the corresponding generator mechanism;
    the top end for each of the plurality of vertical mooring lines traversing through the opening of the corresponding generator mechanism;
    the bottom end for each of the plurality of vertical mooring lines being connected with the submerged structure; and
    the submerged structure being connected with a subsurface environment by the at least one mooring line.

11. The apparatus of wave generators and a mooring system is used to generate electricity as claimed in claim 10, wherein the at least one mooring line is a catenary mooring line.

12. The apparatus of wave generators and a mooring system is used to generate electricity as claimed in claim 10, wherein the at least one mooring line is a plurality of taunt mooring lines.

13. The apparatus of wave generators and a mooring system is used to generate electricity as claimed in claim 1 comprises:
- a plurality of surrounding floating hulls;
- the anti-drift mooring system comprises a plurality of vertical mooring lines, a submerged structure, and a plurality of horizontal mooring lines;
- each of the plurality of vertical mooring lines comprises a top end and a bottom end;
- the top end and the bottom end being oppositely positioned from each other along the vertical mooring line;
- the top end for each of the plurality of vertical mooring lines being tangentially connected with the uni-directional recoiling pulley of a corresponding generator mechanism, wherein the plurality of generator mechanisms includes the corresponding generator mechanism;
- the top end for each of the plurality of vertical mooring lines traversing through the watertight gasket of the corresponding generator mechanism;
- the top end for each of the plurality of vertical mooring lines being perimetrically engaged around the articulated pulley of the corresponding generator mechanism;
- the top end for each of the plurality of vertical mooring lines traversing through the opening of the corresponding generator mechanism;
- the bottom end for each of the plurality of vertical mooring lines being connected with the submerged structure;
- the plurality of horizontal mooring lines comprises a plurality of connecting lines and at least one structural line;
- the plurality of horizontal mooring lines being perimetrically positioned around the floating hull;
- the floating hull being connected to a subsurface environment by the at least one structural line; and
- the floating hull being connected to the plurality of surrounding floating hulls by the plurality of connecting lines.

14. The apparatus of wave generators and a mooring system is used to generate electricity as claimed in claim 1 comprises:
- a plurality of surrounding floating hulls;
- the anti-drift mooring system comprises a plurality of vertical mooring lines, a submerged structure, at least one mooring line, and a plurality of horizontal mooring lines;
- each of the plurality of vertical mooring lines comprises a top end and a bottom end;
- the top end and the bottom end being oppositely positioned from each other along the vertical mooring line;
- the top end for each of the plurality of vertical mooring lines being tangentially connected with the uni-directional recoiling pulley of a corresponding generator mechanism, wherein the plurality of generator mechanisms includes the corresponding generator mechanism;
- the top end for each of the plurality of vertical mooring lines traversing through the watertight gasket of the corresponding generator mechanism;
- the top end for each of the plurality of vertical mooring lines being perimetrically engaged around the articulated pulley of the corresponding generator mechanism;
- the top end for each of the plurality of vertical mooring lines traversing through the opening of the corresponding generator mechanism;
- the bottom end for each of the plurality of vertical mooring lines being connected with the submerged structure;
- the submerged structure being connected with a subsurface environment by the at least one mooring line;
- the plurality of horizontal mooring lines being perimetrically positioned around the submerged structure; and
- the submerged structure being connected with the plurality of surrounding floating hulls by the plurality of horizontal mooring lines.

15. The apparatus of wave generators and a mooring system is used to generate electricity as claimed in claim 1 comprises:
- the anti-drift mooring system comprises a plurality of vertical mooring lines, a submerged structure, a plurality of horizontal mooring lines, at least one spring buoy, and at least one mooring line;
- each of the plurality of vertical mooring lines comprises a top end and a bottom end;
- the top end and the bottom end being oppositely positioned from each other along the vertical mooring line;
- the top end for each of the plurality of vertical mooring lines being tangentially connected with the uni-directional recoiling pulley of a corresponding generator mechanism, wherein the plurality of generator mechanisms includes the corresponding generator mechanism;
- the top end for each of the plurality of vertical mooring lines traversing through the watertight gasket of the corresponding generator mechanism;
- the top end for each of the plurality of vertical mooring lines being perimetrically engaged around the articulated pulley of the corresponding generator mechanism;
- the top end for each of the plurality of vertical mooring lines being inserted through the opening of the corresponding generator mechanism;
- the bottom end for each of the plurality of vertical mooring lines being connected with the submerged structure;
- the plurality of horizontal mooring lines being perimetrically positioned around the floating hull;
- the floating hull being connected with the at least one spring buoy by the plurality of horizontal mooring lines; and
- the at least one spring buoy being connected with a subsurface environment by the at least one mooring line.

16. The apparatus of wave generators and a mooring system is used to generate electricity as claimed in claim 15 comprises:
- a plurality of surrounding floating hulls;
- the plurality of surrounding floating hulls being positioned adjacent to the at least one spring buoy; and
- the at least one spring buoy being connected to the plurality of surrounding floating hulls.

* * * * *